(12) United States Patent
Shatdal

(10) Patent No.: US 6,694,324 B1
(45) Date of Patent: Feb. 17, 2004

(54) DETERMINATION OF RECORDS WITH A SPECIFIED NUMBER OF LARGEST OR SMALLEST VALUES IN A PARALLEL DATABASE SYSTEM

(75) Inventor: Ambuj Shatdal, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/464,100

(22) Filed: Dec. 16, 1999

(51) Int. Cl.[7] .............................................. G06F 17/00
(52) U.S. Cl. ............................. 707/102; 707/1; 707/3; 707/4; 707/101; 707/104
(58) Field of Search ............................ 395/200, 200.47; 707/1, 3, 4, 101, 102, 104; 711/129

(56) References Cited

U.S. PATENT DOCUMENTS

| | | | | |
|---|---|---|---|---|
| 5,261,053 A | * | 11/1993 | Valencia ..................... 395/200 |
| 5,307,485 A | * | 4/1994 | Bordonaro et al. ......... 707/101 |
| 5,515,531 A | * | 5/1996 | Fujiwara et al. ............... 707/3 |
| 5,566,315 A | * | 10/1996 | Milillo et al. ............... 395/440 |
| 5,577,249 A | * | 11/1996 | Califano ..................... 707/100 |
| 5,724,573 A | * | 3/1998 | Agrawal et al. ................ 707/6 |
| 5,765,150 A | | 6/1998 | Burrows |
| 5,815,662 A | * | 9/1998 | Ong ....................... 395/200.47 |
| 5,852,818 A | * | 12/1998 | Guay et al. ..................... 707/1 |
| 5,870,752 A | | 2/1999 | Gibbons et al. |
| 5,875,464 A | * | 2/1999 | Kirk ............................ 711/129 |
| 5,878,411 A | | 3/1999 | Burroughs et al. |
| 5,881,380 A | | 3/1999 | Mochizuki et al. |
| 5,915,251 A | | 6/1999 | Burrows et al. |
| 5,960,194 A | * | 9/1999 | Choy et al. ................. 707/102 |
| 6,047,356 A | * | 4/2000 | Anderson et al. ........... 711/129 |
| 6,438,741 B1 | * | 8/2002 | Al-omari et al. ............... 717/9 |

OTHER PUBLICATIONS

Abugharbieh et al., "A Fast Algorithm For the Disjunctive Decomposition of m–Valued Functions", IEEE, 1993, pp. 118–125.*

* cited by examiner

*Primary Examiner*—Thuy N. Pardo
(74) *Attorney, Agent, or Firm*—Pretty, Schroeder & Poplawski (57) ABSTRACT

A method, apparatus, and article of manufacture for selecting one or more of the highest ranking records in a database system that has one or more processing units. At each processing unit, a candidate list of records is generated in a memory space of the processing unit. Each record contains a field value. The generated candidate list of records is ranked based on the field value as each new candidate is added to the generated candidate list. When the memory space of the processing unit is insufficient, the ranked candidate list of records are transferred from the memory space of the processing unit to a data store. At the data store, a predefined number of extrema values are identified by using the transferred candidate list of records.

21 Claims, 8 Drawing Sheets

DETERMINATION OF RECORDS WITH A SPECIFIED NUMBER OF LARGEST OR SMALLEST VALUES IN A PARALLEL DATABASE SYSTEM

BACKGROUND OF THE INVENTION

1. Field of the Invention

This invention relates in general to database systems, and, in particular, to the determination of records with a specified number of largest or smallest values in a parallel database system

2. Description of Related Art

Databases are computerized information storage and retrieval systems. A Relational Database Management System (RDBMS) is a database management system (DBMS) which uses relational techniques for storing and retrieving data. Relational databases are organized into tables which consist of records and fields of data. The records are formally called tuples. A database will typically have many tables and each table will typically have multiple tuples and multiple fields. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

One of the most common SQL queries executed by the RDBMS software is the SELECT statement. In SQL, the typical SELECT statement may comprise the format: "SELECT <clause> FROM <clause> WHERE <clause> GROUP BY <clause> ORDER BY <clause>." The clauses generally must follow this sequence, but only the SELECT and FROM clauses are required. The result of a SELECT statement is a subset of data retrieved by the RDBMS software from one or more existing tables stored in the relational database, wherein the FROM clause identifies the name of the table or tables from which data is being selected. The subset of data is treated as a new table, termed the result table, which typically comprises a temporary table. In general, the items specified in the SELECT clause of the SELECT statement determine the fields that will be returned in the result table from the table(s) identified in the FROM clause.

The WHERE clause determines which records should be returned in the result table. Generally, the WHERE clause contains a search condition that must be satisfied by each record returned in the result table. The records that meet the search condition form an intermediate set, which is then processed further according to specifications in the SELECT clause. The search condition typically comprises one or more predicates, each of which specify a comparison between two values comprising fields, constants or correlated values. Multiple predicates in the WHERE clause are themselves typically connected by Boolean operators.

The GROUP BY clause determines which records should be returned in the result table. Generally, the GROUP BY clause contains a search condition that causes the records in an intermediate result set to be grouped according to the values in the field(s) specified by the GROUP BY clause. The GROUP BY clause follows the WHERE clause, if there is one, and is most commonly used when the SELECT clause contains one or more field functions.

The sequence in which the records of the result tables are presented can be specified by using the ORDER BY clause. The ORDER BY clause causes the records to be returned in the order of the field name specified by the ORDER BY clause. The ORDER BY clauses may be followed by the clauses DESC (descending) and ASC (ascending) to indicate the order of a particular set of records.

When retrieving the maximum and/or minimum values from a set of data stored in a table, users often include an ORDER BY clause in the SELECT statement. The maximum value is the largest value in the set of data and the minimum value is the smallest value in the set of data. For example, assume a set of data contains the following values: 1, 2, 3, 4, 5, 6, 7, 8, 9, and 10. The maximum value is 10 and the minimum value is 1.

Often times users may desire to identify records that contain a specified number of the largest or smallest values from a set of data stored in a table, instead of just computing the maximum and minimum values. The specified number of largest or smallest values are referred to as extrema values. Referring to the example above, assume a user desires to identify the two largest values and the two smallest values. The two largest values are 9 and 10, and the two smallest values are 2 and 1.

In an exemplary SQL request, the number of largest or smallest values is specified by defining the following: a value n that represents the number of largest or smallest values; an optional grouping expression; and an order specification (i.e., an ORDER BY clause) that specifies either an ascending or a descending order. An exemplary SQL request is shown below.

SELECT FIRST (10) stores, prod, sales
FROM sales_table
GROUP BY store
ORDER BY sales DESC.

In this example, the SELECT statement contains FROM, GROUP BY, and ORDER BY clauses. The SELECT and the FROM clauses identify the number of records, the fields of the table, and the table from which the records are to be retrieved. In particular, the number of records is 10, and the fields of the sales_table are stores, prod, and sales. The fields are grouped relative to the store field, and the fields are ordered in descending order relative to values of the sales field.

An alternative example is shown below:

SELECT store, prod, sales
FROM sales_table
GROUP BY store
QUALIFY RANK (sales DESC)<=10.

This example is similar to the first example. The difference between the first and second example is that a QUALIFY RANK clause is used instead of an ORDER BY clause. The QUALIFY RANK clause is a clause that was introduced in the Teradata7 Version 2 Release 3 extended SQL, offered by NCR Corporation in Dayton, Ohio, to support the filtering of records based on function computations, such as RANK, Cumulative Totals, etc. Hence, QUALIFY RANK (sales DESC)<=10 requests records that satisfy the qualification criterion RANK (sales DESC)<=10. It is noted that in some cases, RANK may not cause the physical ordering of records. For example, the RANK values may be computed by ordering the records relative to the value of the sales field.

Another technique for determining n extrema values includes the following single processor large memory technique. Assume that a computer system is a single processor system that has an unlimited (or infinite) amount of memory. With this computer system, a user could determine the records containing the n extrema values, for each grouping expression, in one pass as follows: (1) track the current set of n extrema values; (2) read the next value from the next record; (3) compare the next value with the current set of n extrema values; and (4) update the current set of n extrema values with the new value, when the new value is larger than the nth largest value. The main problem with this technique is that it requires an unlimited amount of memory. In particular, a large amount of memory is required when a large number of grouping expressions exist. The large memory requirement makes this technique impractical in a multiuser, single processor system. The large memory requirement also makes this technique impractical in a multi-user, multi-processing unit environment of a parallel database system.

Like the single processor large memory technique discussed above, many of the traditional techniques for computing n extrema values require a large memory. These other traditional techniques frequently involve either (1) ordering an entire set of records (i.e., a table) relative to a specified value, and fetching only the records with the first n extrema values; or (2) when a rank feature is available in the database system, using the rank feature to rank all of the values, and returning the records with the first n ranking values (also referred to as the n extrema values). In both cases, the database system has to order all of the records. Consequently, the request processing is very inefficient and slow.

Some of the traditional systems also lack the ability to accurately rank duplicate records. When duplicate values exist, traditional systems may fail to calculate the n extrema values because several records may have the same rank. For example, if n equals 10 and the set of extrema values are as follows: {10, 9, 9, 9, 9, 9, 8, 8, 8, 8, 8, 8, 8, 7, 7, 5, 4, 4, 3, 2, 1}.

In some traditional systems, only the first ten records, {10, 9, 9, 9, 9, 9, 8, 8, 8, 8}, are produced. In these traditional systems, even if one million records had the same (or duplicate) value, the system would only return ten records.

Thus, there is a need in the art for an improved technique of computing the n extrema values that uses less memory and incorporates all duplicate records into the result.

SUMMARY OF THE INVENTION

To overcome the limitations in the prior art described above, and to overcome other limitations that will become apparent upon reading and understanding the present specification, the present invention discloses a method, apparatus, and article of manufacture for selecting one or more of the highest ranking records in a database system that has one or more processing units.

At each processing unit, a candidate list of records is generated in a memory space of the processing unit. Each record contains a field value. The generated candidate list of records is ranked based on the field value as each new candidate is added to the generated candidate list. When the memory space of the processing unit is insufficient, the ranked candidate list of records are transferred from the memory space of the processing unit to a data store. At the data store, a predefined number of extrema values are identified by using the transferred candidate list of records.

BRIEF DESCRIPTION OF THE DRAWINGS

Referring now to the drawings in which like reference numbers represent corresponding parts throughout.

DETAILED DESCRIPTION

In the following description of an embodiment of the present invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1A:
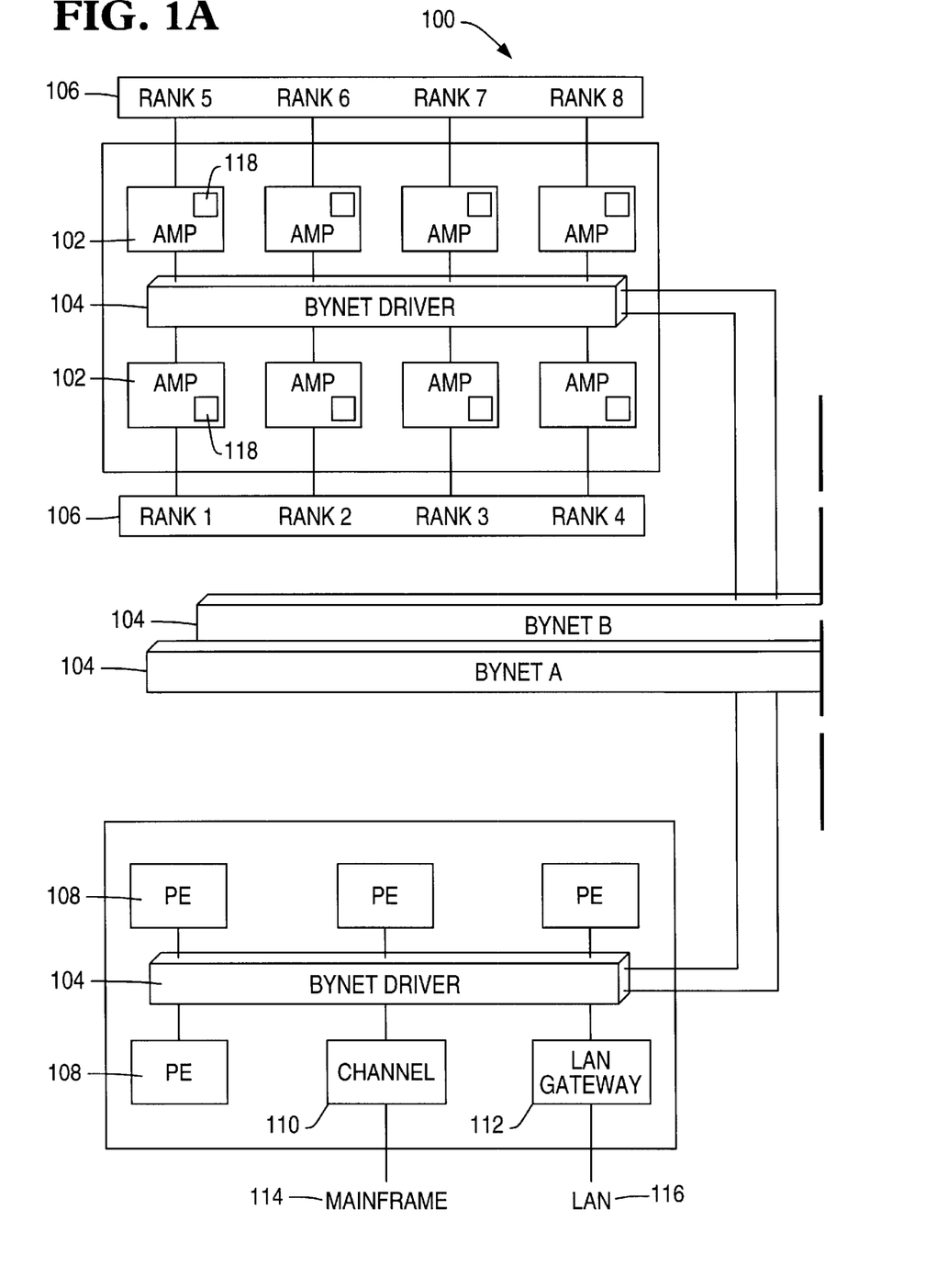
FIG. 1 schematically illustrates a hardware environment of a preferred embodiment of the present invention, and more particularly, illustrates a typical parallel database system.
Figure 1B:
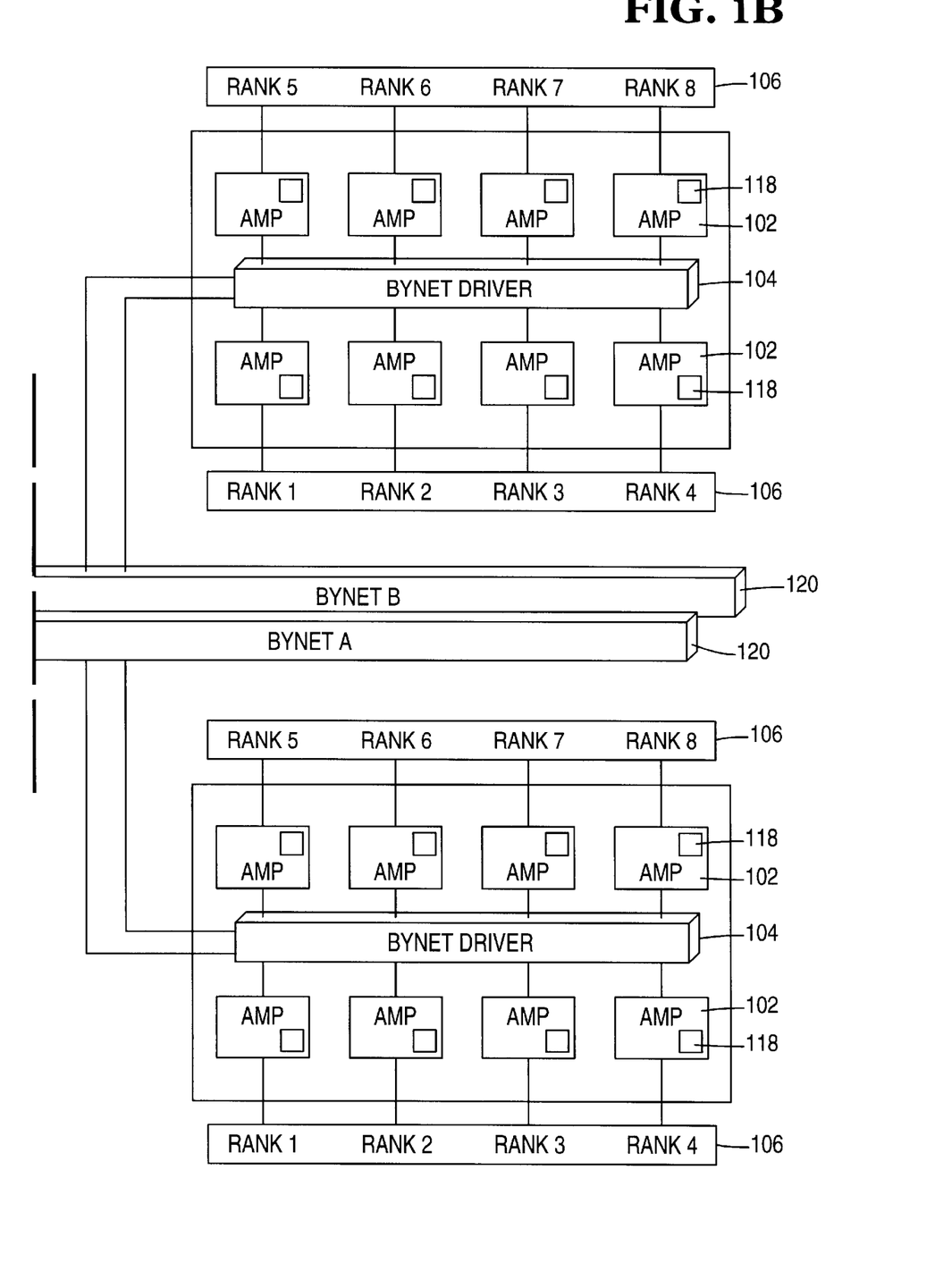

FIG. 1 illustrates a computer hardware environment that could be used with the present invention. In the computer hardware environment, a computer system 100 is comprised of one or more nodes 102 interconnected by a network. Each node 102 is comprised of one or more processors interconnected by a network driver 104 and coupled to a redundant array of independent (or inexpensive) disks (RAID) 106. The computer system is also comprised of one or more parsing engines 108, a channel 110, a local area network (LAN) gateway 112. The channel 110 is coupled to a mainframe 114, and the LAN gateway 112 is coupled to a LAN 116. The present invention (hereinafter referred to as the extrema values system 118) is embodied in a computer program executed or performed by the computer system 100. The computer program itself may be stored, for example, in the memory of the processors 102.

In the exemplary computer hardware environment of FIG. 1, a massively parallel processor (MPP) computer system 100 is illustrated. Each of the processors or nodes 102 are typically comprised of uni-processor or symmetric multi-processor (SMP) architectures. The system 100 includes interface processor access module processors (AMP) 102, all of which are connected by a network driver 104 (also known as a BYNET DRIVER). The network driver 104 is connected to an interconnect network driver 120. The AMPs 102 manage one or more attached RAIDs 106. The PEs 108 provide the connection to client systems on channel connected mainframes.

Operators of the computer system 100 use a terminal or workstation to transmit electrical signals to and from the computer system 100 that represent commands for performing various search and retrieval functions, termed queries, against the databases. In the preferred embodiment, these queries conform to the Structured Query Language (SQL) standard, and invoke functions performed by Relational DataBase Management System (RDBMS) software executed by the system 100. In the preferred embodiment of the present invention, the RDBMS software comprises the Teradata7 product offered by NCR, Corporation in Dayton, Ohio. The RDBMS software performs the functions necessary to implement the RDBMS and SQL standards, i.e., definition, compilation, interpretation, optimization, database access control, database retrieval, and database update.

Work is divided among the processors 102 in the system 100 by spreading the storage of the records of each table across all of the AMP nodes 102. Thus, each AMP node 102 stores some of the records of each table and work is managed by the system 100 so that the task of operating on the records is performed by the AMP node 102 managing the RAIDs 106 that store the specific records.

Software executed by the PEs 108 causes all functions performed among the AMP nodes 102 to operate in parallel. As a result, the system of. FIG. 1 applies a multiple instruction stream, multiple data stream (MIMD) concurrent processing architecture to implement a relational database management system.

The computer system 100 does face the issue of how to divide a SQL query into smaller sub-queries, each of which can be assigned to an AMP node 102. In the preferred embodiment, a hashing algorithm assigns data records to AMP nodes 102. The columns or fields comprising the primary index of the records are typically put through a modulo prime number hashing algorithm, which results in a hash "bucket" number. A hash map provides the mapping of hash buckets to AMP nodes 102. There are generally a large number of hash bucket numbers, and each AMP node 102 may be assigned several bucket numbers for both prime and fallback hash maps. This makes it possible to evenly divide the storage data, and hence the processing load, among the AMP nodes 102 in the system 100.

Those skilled in the art will recognize that the exemplary hardware environment illustrated in FIG. 1 is not intended to limit the present invention. Indeed, those skilled in the art will recognize that other alternative hardware environments may be used without departing from the scope of the present invention.

Creating A User Specified Number of Extrema Values

The disclosed embodiment of the present invention provides an extrema values system 118 for creating a list of a user specified number of the largest or smallest values from a set of records. The extrema values system 118 creates a list of records that have the first n smallest or largest values, relative to an ordering expression (e.g., a QUALIFY RANK clause). More specifically, the extrema values system 118 ultimately produces a set of records that satisfy the QUALIFY RANK (ordering expression)<=n. This set of records (or list) is referred to as an extrema values list, and the largest or smallest values are referred to as extrema values. The set of records, commonly referred to as a table, is hashed and partitioned across the multiple processing units 102, and the extrema values system 118 is invoked in parallel on each processing unit 102.

There are two aspects of the present invention. The first aspect is directed to creating a candidate extrema value list, and storing this list on a cache along with any grouping expressions. This aspect is referred to as caching the candidate extrema values. During the caching phase, the extrema values list and the extrema values are referred to as candidates because they potentially qualify as extrema values. The requirements for qualifying as an extrema values list and for qualifying as extrema values are discussed below in the Caching section.

The second aspect is directed to using the candidate extrema value list to create a user specified number of extrema values. This aspect is referred to as processing the candidate extrema values.

Caching the Candidate Extrema Values

The extrema values system 118 creates the extrema values list from a set of records in response to a user's request. More specifically, the extrema values system 118 reads all of the records and creates the extrema values list by only sorting a portion of the read records. The extrema values system 118 sorts these records in either a descending or an ascending order, based on a user's request. The user's request may also include a grouping expression that causes the extrema values system 118 to group the records according to the values in the fields specified by the grouping expression.

When a grouping expression exists, the extrema values system 118 creates one or more extrema values lists, with each list focusing on a particular group. The extrema values system 118 stores the grouping expressions in the cache of each processing unit. In absence of a grouping expression, the extrema values system 118 only creates one list.

To create the extrema values list(s), the extrema values system 118 reads each record in the set of records. During the reading process, before all of the records have been read, the extrema values list is referred to as a candidate extrema values list, and the elements on the extrema values list are referred to as candidate extrema values. The list and the elements on the list remain candidates until the extrema values system 118 has read the entire set of records and processed the candidate extrema values list. Processing involves calculating the extrema values list by using the candidate extrema values list. Processing will be discussed in detail in the Processing section.

Figure 2:
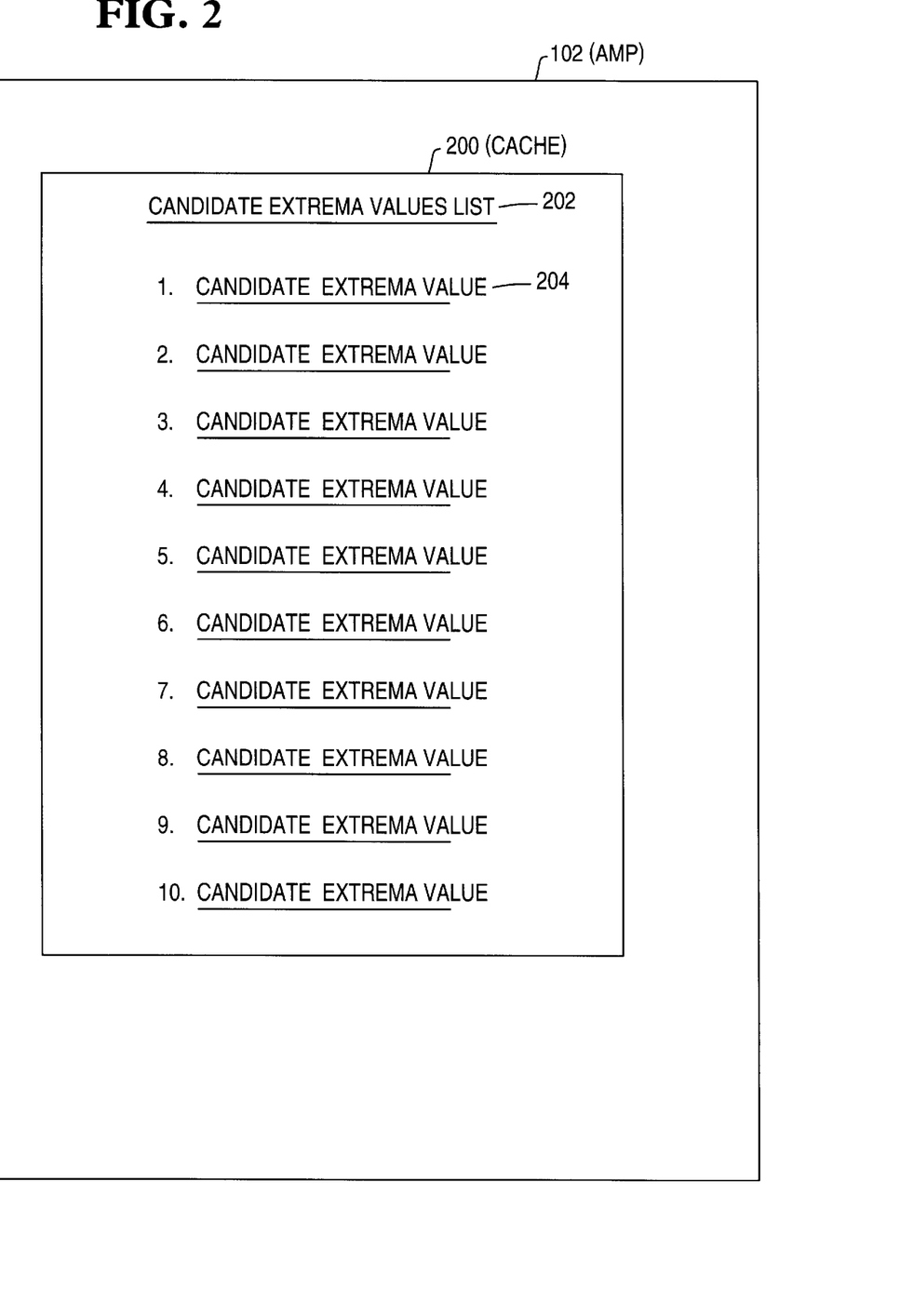
FIG. 2 illustrates a processor and a candidate extrema value list.

FIG. 2 illustrates an exemplary processor 102. The processor 102 has a cache 200 and a candidate extrema values list 202. Ten candidate extrema values 204 are on the candidate extreme values list 202.

For the first n records, the extrema values system 118 reads a record and places it on a candidate extrema values list 202 until the extrema values list 202 has n values. These n values are the initial candidate extrema values 204. In an embodiment of the present invention, the extrema values system 118 sorts these initial candidate extrema values 204. Hereinafter, to demonstrate how the extrema values system 118 is implemented, it is assumed that the candidate extrema values 204 are sorted in a descending order, with rank one being the largest value and rank n being the nth largest value. Of course, as discussed above, the candidate extrema values 204 can be sorted in an ascending order without exceeding the scope of the present invention. It is noted that the extrema values system 118 is not required to sort the initial candidate extrema values 204. The extrema values system 118 can either maintain the initial candidate extrema values 204 in a sorted ordered as the initial candidate extrema values 204 are entered on the candidate extrema values list 202; or the extrema values system 118 can sort the candidate extrema values 204 after they have been entered onto the candidate extrema values list 202.

Once the initial candidate extrema values 204 are sorted, the nth largest candidate extrema value 204 is referred to as the sentinel value. When the extrema values system 118 reads subsequent records, it compares each record to the sentinel value. If the subsequent record contains a user specified field whose value is less than the sentinel value, the extrema values system 118 disqualifies that record. On the other hand, if a subsequent record contains a user specified field whose value is greater than the sentinel value, the extrema values system 118 may disqualify the sentinel value and adds the subsequent record to the candidate extrema values list 202. The extrema values system 118 ignores disqualified records and does not use them to create the extrema values list 202.

The extrema values system 118 also adds a subsequent record to the extrema values list 202 when the subsequent record contains a user specified field whose value is equal to the sentinel value. Such values are referred to as duplicate values. When duplicate values exist, the extrema values system 118 may ultimately calculate more than n extrema values because several records may have the same rank.

To illustrate the duplicate values case, assume the extrema values are: {10, 9, 9, 9, 9, 9, 8, 8, 8, 8, 8, 8, 8, 7, 7, 5, 4, 4, 3, 2, 1}.

After processing, the extrema values system 118 will produce the corresponding candidates: {10, 9, 9, 9, 9, 9, 8, 8, 8, 8, 8, 8, 8} and their corresponding ranks would be {1, 2, 2, 2, 2, 2, 7, 7, 7, 7, 7, 7, 7} all being ranked less than 10 (note that value 7 has a rank of 14). Unlike traditional systems, the extrema values system 118 incorporates the duplicate records into the extrema values list 202.

The process of comparing the subsequent records to the sentinel values continues until the extrema values system 118 has read the entire set of records. Before adding a new record to the cache 200, the extrema values system 118 always checks whether the cache 200 has available memory space. When the cache 200 lacks available memory space, the extrema values system 118 removes all records from the cache 200, except records that contain the sentinel values. To put it differently, the extrema values system 118 removes the n−1 records from the cache 200, and the nth record (or the record containing the sentinel value) remains in the cache 200. This removal process is referred to as flushing. Flushing will be discussed in detail in the Processing section. The sentinel values remain in the cache 200 because they are used to disqualify records. The grouping expressions remain in the cache 200 because they provide information about the manner in which the records should be grouped.

Figure 3:
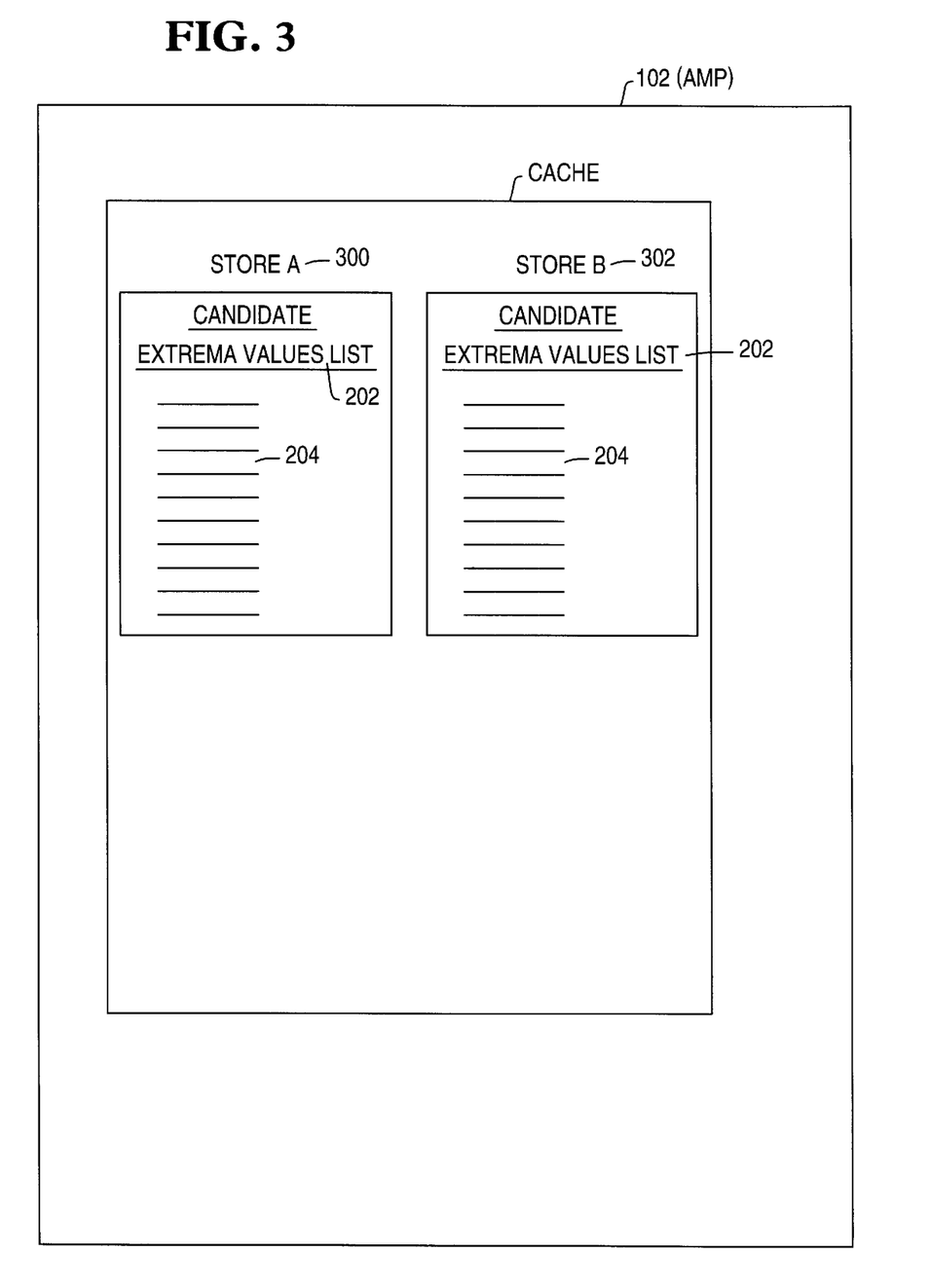
FIG. 3 illustrates a processor and two grouping expressions.

FIG. 3 illustrates an exemplary processor 102 and two grouping expressions 300 and 302. The grouping expressions cause the records to be grouped according to the values in the field(s) specified by a grouping expression clause (e.g., a GROUP BY clause). Each grouping expression 300 and 302 has a candidate extrema values list 202.

Each group has four group entry states: filling, almost full, full, and overflow. The group entry states indicate whether available space exists on the candidate extrema values list 202. Available space exists on the candidate extrema values list 202 when the number of candidate extrema values 204 is less than n. The state of filling indicates that two or more spaces exist on the candidate extrema values list 202. The state almost full indicates that only one space exists on the candidate extrema values list 202. The state full indicates that the no spaces exist on the candidate extrema values list 202.

When the extrema values system 118 initially places records in the cache 200, the cache 200 may contain less than n records. In this case, the subsequent records are added to the candidate extrema values list 202 (subject to memory availability), and no records are disqualified. For each group, once the extrema values system 118 places n records in the cache, the candidate extrema values list 202 is defined and the group's state is full. Records can then be disqualified using the comparison technique discussed above. The state overflow indicates that the candidate extrema values list 202 has been flushed.

The cache 200 contains one or more candidate extrema values lists 202 and grouping expressions. When multiple candidate extrema values lists 202 exist, each candidate extrema values list 202 is associated with a particular grouping expression. The extrema values system 118 flushes a candidate extrema values list 202 when the cache 200 lacks available memory space. The extrema values system 118 may flush the candidate extrema values list 202 when the candidate extrema values list 202 contains n candidate extrema values 204 or when the candidate extrema values list 202 contains less than n candidate extrema values 204. A candidate extrema values list 202 that is flushed when it contains n candidate extrema values 204 has a group entry state of overflow. The overflow state indicates that even though there are fewer than n records on the candidate extrema values list 202, the sentinel value is still valid. That is, the extrema values system 118 can still use the sentinel value to disqualify records. On the other hand, a candidate extrema values list 202 that is flushed when it contains fewer than n candidate extrema values 204 may have the group entry state of filling or almost full. In this case, the candidate extrema values list 202 was flushed before the sentinel value was determined.

After flushing, the extrema values system 118 uses the sentinel value and the grouping expressions to create a second candidate extrema values list 202. The extrema values system 118 continues to read subsequent records. When the records contain user specified field values that are less than the sentinel value, the extrema values system 118 disqualifies the records. Otherwise, when the subsequent records contain user specified field values that are more than the sentinel value, the extrema values system 118 adds the records to the candidate extrema values list 202 until n−1 values have been added to the list, creating a second set of the candidate extrema values list 202. This second set of the candidate extrema values list 202 is an addition to the previous candidate extrema values list 202. The only commonality between the previous list and the second list is the current sentinel value (i.e., the sentinel value that existed at the time in which the extrema values system 118 flushed the n−1 candidate extrema values 204 from the previous list). The extrema values system 118 creates subsequent extrema values list 202 whenever the cache 200 lacks available memory space. Therefore, it is conceivable that the extrema values system 118 could create multiple candidate extrema values list 202.

With respect to grouping expressions, the grouping expressions could be so numerous that the extrema values system 118 fills the cache's available memory space with grouping expression information. In this case, due to the lack of available memory, the extrema values system 118 may be prevented from creating a candidate extrema values list 202 that contains n candidate extrema values 204. That is, the candidate extrema values list 202 may never achieve the full state, and thus, the extrema values system 118 will be prevented from determining the sentinel value. Without the sentinel value, the extrema values system 118 cannot disqualify records. Consequently, most of the records (i.e., the entire table) are sorted and processed in the processing step. This scenario rarely occurs. The maximum number of groups may be controlled by the size of cache, the size of the set of records, n, or any suitable factor. Once the maximum number of groups is reached, the extrema values system 118 flushes the records that belong to the groups which are missing from the cache.

Figures 4, 4D:
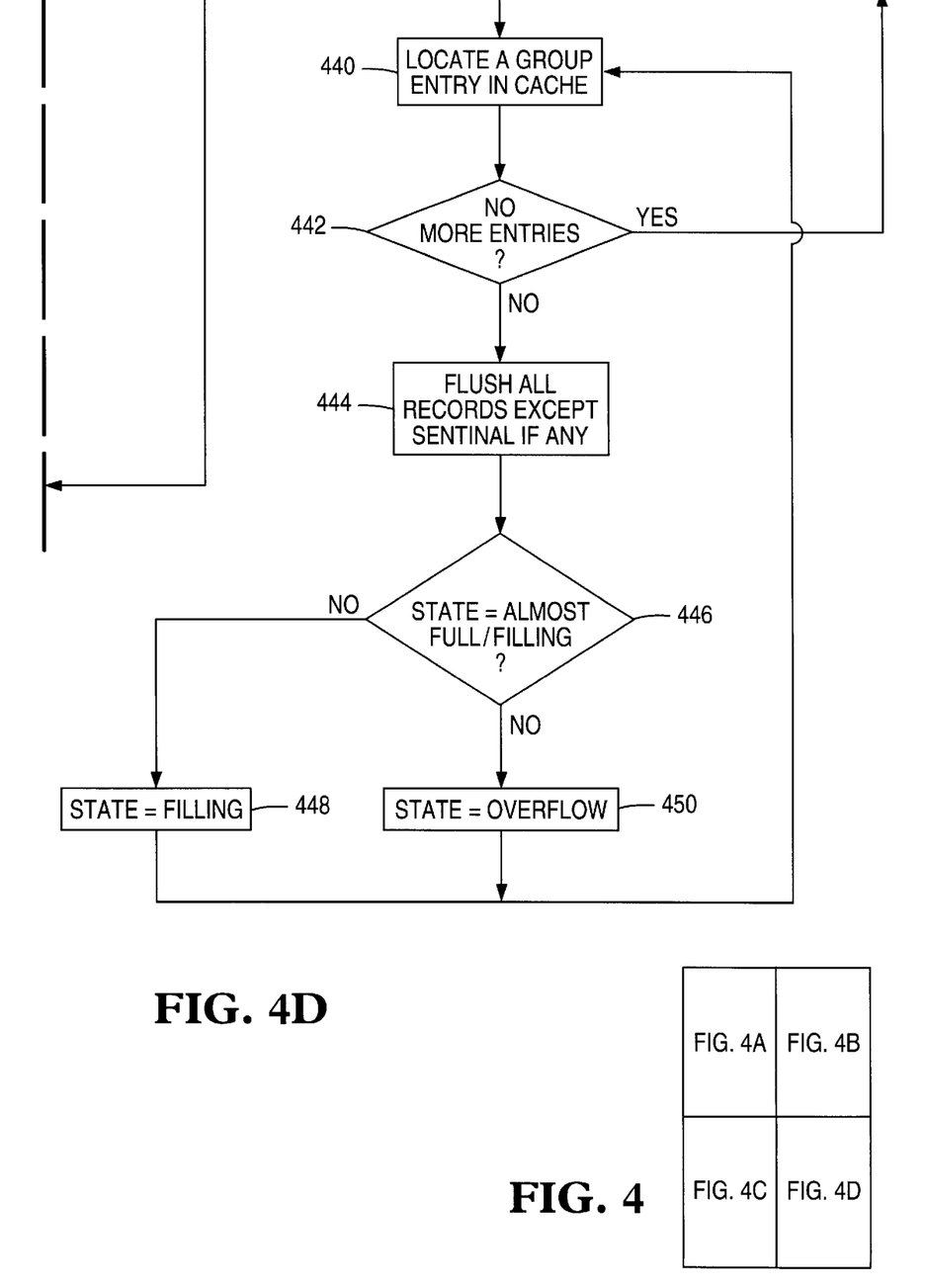
FIG. 4 is a flow chart illustrating the steps performed by the extrema values system to create a candidate extrema value list and flush the candidate extrema value list in accordance with an embodiment of the present invention.
Figure 4A:
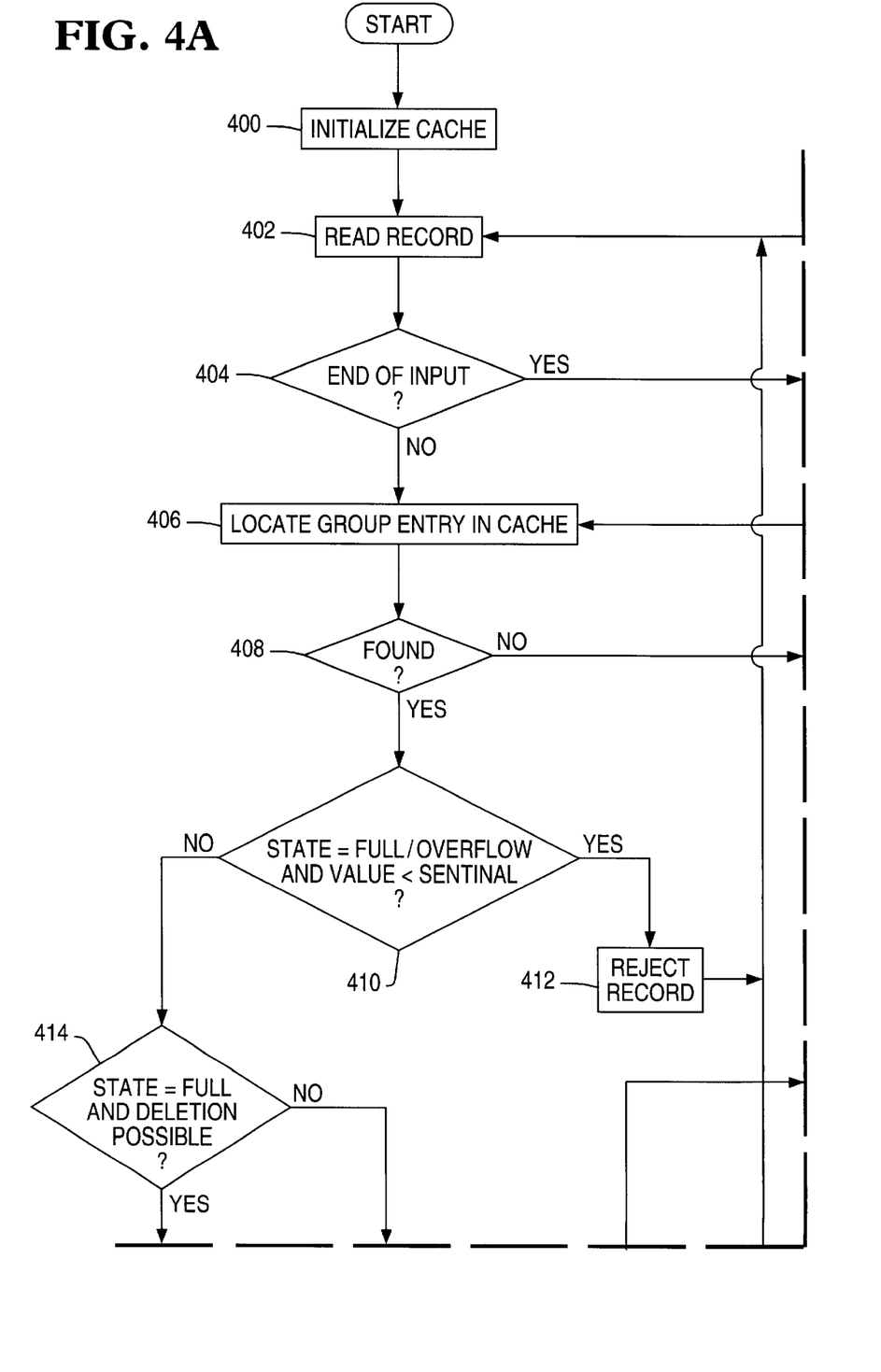
Figure 4B:
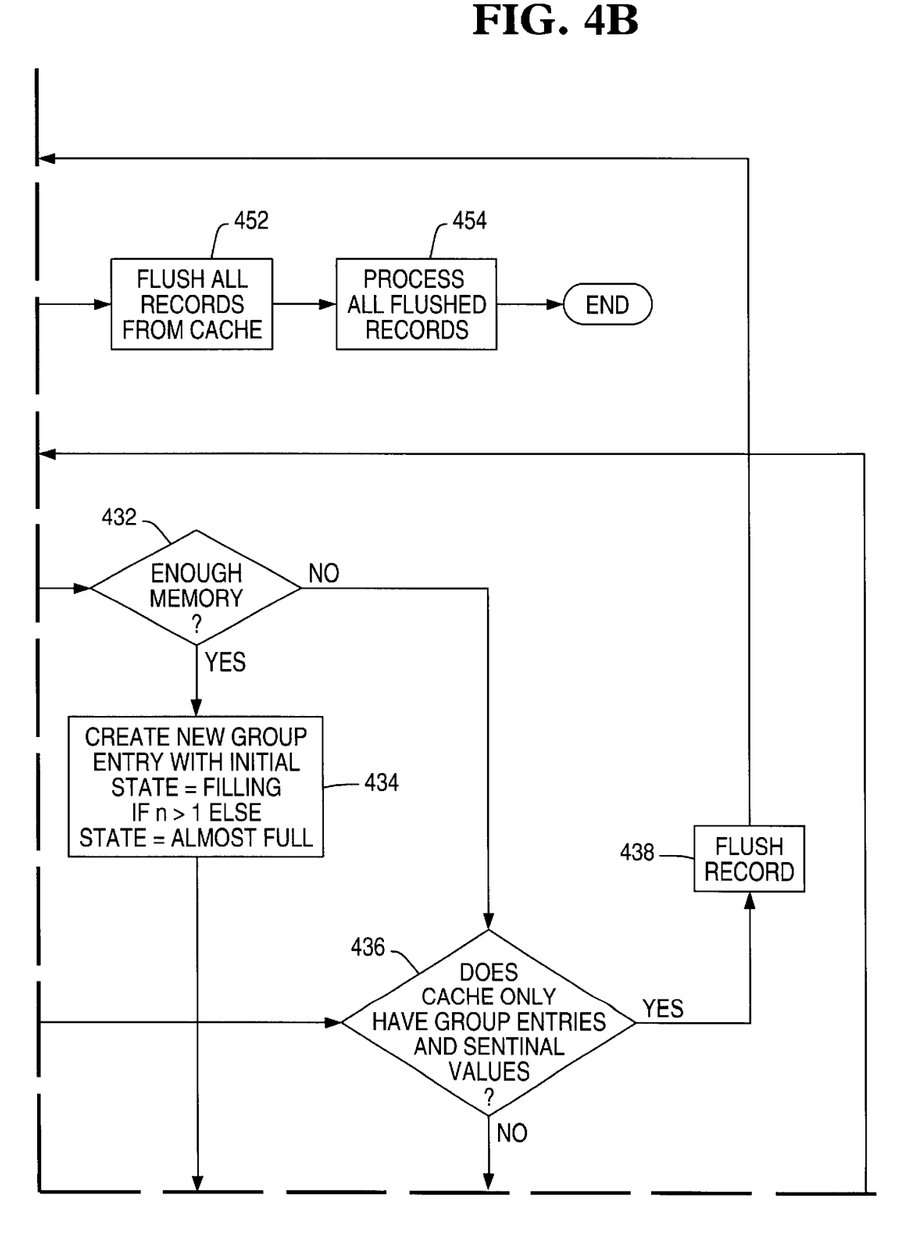
Figure 4C:
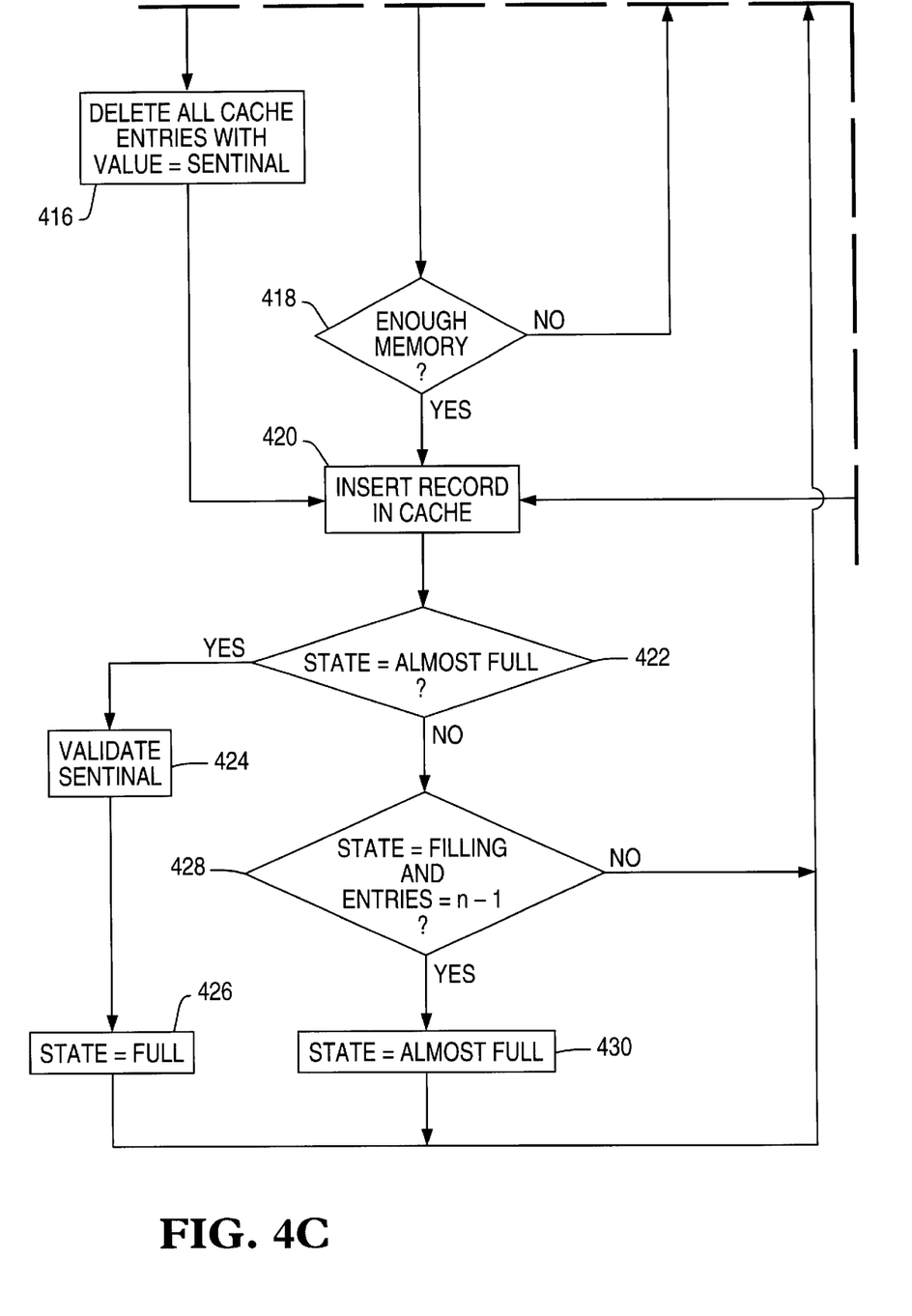

FIG. 4 is a flow chart illustrating the steps performed by the extrema values system 118 in accordance with an embodiment of the present invention. The first step involves initializing the cache, as represented by block 400. On each processing unit, the extrema values system 118 uses the cache 200 to store all the candidate extrema values 204 or a subset of the candidate extrema values 204. The first n records that the extrema values system 118 reads are used to initialize the cache. More specifically, the records that contain the extrema values are ordered in either a descending or ascending order, depending upon the order specified in the request, and subsequent records are compared to the nth largest value (or nth smallest value). The extrema values system 118 also uses the cache 200 to store any fields specified in the grouping expression.

Once the cache 200 is initialized the extrema values system 118 reads a subsequent record, as represented by block 402. Block 404 is a decision block that represents the extrema values system 118 determining if an end of input has been reached. When an end of input has been reached, the extrema values system 118 proceeds to block 452. Otherwise the extrema values system 118 proceeds to block 406.

Block 406 represents the extrema values system 118 locating a group entry (also referred to as a grouping expression), if any, in the cache. Block 408 is decision block that represents the extrema values system 118 determining whether the extrema values system 118 located a group entry. When the extrema values system 118 does not locate a group entry, the extrema values system 118 proceeds to block 432. Otherwise, the extrema values system 118 proceeds to block 410.

Block 410 is decision block that represents the extrema values system 118 determining whether the group entry state is full or overflow, and determining whether the user specified field value is less than the sentinel value. The group entry state is full when the candidate extrema values list 202 contains n candidate extrema values 204. The group entry state is overflow when the extrema values system 118 has flushed the candidate extrema values list 202 and the sentinel value is still valid. When the answer to both of the questions is yes, the extrema values system 118 proceeds to block 412. Block 412 represents the extrema values system 118 rejecting (or disqualifying) the record. The extrema values system 118 ignores disqualified records, and does not use them to create the n extrema values list 202. Otherwise, when the answers to one of the questions is no, the extrema values system 118 proceeds to block 414.

Block 414 is a decision block that represents the extrema values system 118 determining whether the group entry state is full and whether deletion of duplicate records is possible. Deletion is possible when the following equation is satisfied:

(total number of entries)−(number of records with value=sentinel)+1=number of extrema values.

When deletion is possible, the extrema values system 118 proceeds to block 416. Otherwise, the extrema values system 118 proceeds to block 418. Block 416 represents the extrema values system 118 deleting all candidate extrema values with values equal to the sentinel value. Block 418 is a decision block that represents the extrema values system 118 determining whether the cache 200 has available memory. If the cache 200 lacks available memory, the extrema values system 118 proceeds to block 436. Otherwise, the extrema values system 118 proceeds to block 420.

Block 420 represents the extrema values system inserting a record into the cache, and hence, adding the record's field value to the candidate extrema values list 202 that focuses on a grouping expression, if any. It is noted that the field value is greater than the sentinel value.

Block 422 is a decision block that represents the extrema values system 118 determining if the group entry state of the candidate extrema values list 202 is almost full. The group entry state almost full indicates that only one space exists on the candidate extrema values list 202. When the group entry state is not almost full, the extrema values system proceeds to block 428. Otherwise, the extrema values system proceeds to 424.

Block 424 represents the extrema values system validating the sentinel. The extrema values system 118 validates the sentinel because the last record (inserted at block 420) was the (n−1)th record. At this point, the candidate extrema values list 202 has n candidate extrema values 204, including n−1 candidate extrema values 204 and a sentinel value. The extrema values system 118 then sets the group entry state to full, as represented by block 426.

Block 428 is decision block that represents the extrema values system 118 determining whether the group entry state is filling and whether the candidate extrema values list 202 contain n−1 candidate extrema values 204. If so, the extrema values system 118 returns to block 402 to read the next record. Otherwise, the extrema values system sets the group entry state to almost full, as represented by block 430.

Block 432 represents the extrema values system 118 determining whether the cache 200 has enough memory. When the cache 200 has available memory space, the extrema values system 118 proceeds to block 434. Otherwise, the extrema values system proceeds to block 436.

Block 434 represents the extrema values system 118 both creating a new group entry, and when n is greater than 1, setting the group entry state to filling. Otherwise, when n is less than or equal to 1, the extrema values system 118 sets the group entry state to almost full. From block 434, the extrema values system then proceeds to block 420.

Block 436 is decision block that represents the extrema values system 118 determining whether the cache 200 only contains group entries and sentinel values. That is, the extrema values system 118 is determining whether records have been removed (i.e., flushed) from the cache 200 due to the lack of available memory space. If so, then the extrema values system 118 flushes the current record (the record read at block 402), as represented by block 438. From block 438, the extrema system proceeds to block 402.

Block 440 represents the extrema values system 118 locating a group entry in the cache.

The extrema values system 118 then determines whether there are no more group entries, as represented by block 442. If there are more group entries, the extrema values system 118 returns to block 406. Otherwise, the extrema values system 118 proceeds to block 444. Block 444 flushes all records except the sentinel values, if any.

Block 446 is decision block that represents the extrema values system 118 determining whether the group entry state is almost full or filling. If so, the extrema values system 118 sets the group entry state to filling, as represented by block 448. Otherwise, the extrema value system 118 sets the group entry state to overflow, as represented by block 450. From both blocks 448 and block 450, the extrema values system 118 returns to block 440.

Block 452 represents the extrema values system 118 flushing all records from the cache, and block 454 represents the extrema values system 118 processing the flushed records. Processing will be discussed in detail below.

Processing the Candidate Extrema Values

The determination of extrema values involves hash redistributing the candidate extrema values 204 (also referred to as the qualifying records) using the grouping expressions. The candidate extrema values include all the candidate extrema values 204, including those candidate extrema values 204 that have been flushed. Hash redistributing involves the parallel processing of the candidate extrema values 204.

As discussed above in the Caching section, the extrema values system 118 flushes out records that can potentially qualify as extrema values (i.e., candidate extrema values 204) when the cache 200 lacks available memory space. The records flushed from the cache 200 are immediately sent to a processor 102, which is selected by hash partitioning on the grouping expression value. Thus, the extrema values system 118 sends all qualifying records (i.e., candidate extrema values 204) of a particular group to the same processor 102.

The extrema values system 118 then evaluates each candidate extrema value 204 and determines which candidate extrema values 204 satisfy the requirements for becoming extrema values, and hence, for being adding to the extrema values list 202. The requirement is that extrema values are the nth largest (or nth smallest) values of the flushed records.

Generally, processing the flushed records should be very fast compared to the caching step, as there should be fewer records that need to be evaluated. For the caching step, the extrema values system 118 had to read and analyze the entire set of records. During the processing step, however, the extrema values system 118 only needs to read and process a portion of the records B the flushed records.

There are two alternative techniques for processing the flushed records. The first technique involves, applying the caching technique discussed above to the qualifying records. If the candidate extrema values have been flushed because the cache 200 memory was insufficient, then the extrema values system 118 re-flushes these candidate extrema values using grouping expressions and order specifications. With respect to ordering, the extrema values 204 system 118 collects the candidate extrema values that have the same grouping expressions and orders the collected candidate extrema records. The extrema value system 118, then scans the ordered result and selects the records that contain the largest (or smallest) n values. Alternatively, if no records were flushed during the caching step, except in the case when the end of input was reached (see FIG. 4, block 404), then the extrema values system 118 places all flushed records on the extrema values list 202.

The second technique involves the extrema values system 118 sorting all of the qualifying records, and then scanning the result and selecting the records that contain the largest or smallest n values. This alternative technique is used when the database system has only one processing unit, or in the rare case, when the set of records is already partitioned on the grouping expression.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a database system including one or more processing units, each processing unit including a local memory, and a data store shared by all of said processing units; a method of selecting one or more of the highest ranking records in a table of records, the method comprising-the steps of:

partitioning said table of records into a plurality of table partitions;

associating each one of said table partitions with a different one of said processing units;

at each processing unit:

generating a candidate list of records from the table partition associated with the processing unit in said local memory of the processing unit, wherein each record contains a field value;

ranking the generated candidate list of records based on the field value, as each new candidate is added to the generated candidate list;

when memory space within said local memory of the processing unit is insufficient, transferring the ranked candidate list of records from the local memory of the processing unit to said shared data store; and at the conclusion of processing the records contained in the table partition associated with the processing unit, transferring the ranked candidate list of records from the local memory of the processing unit to said shared data store; and at the data store, identifying a predefined number of extrema values by using the transferred candidate list of records obtained from all of said processing units.

2. The method of claim 1, wherein the data store is a different processor unit that the candidate list of records is hashed to.

3. The method of claim 1, wherein ranking further comprises the step of partitioning the candidate list of records into two or more groups based on a grouping expression.

4. The method of claim 1, wherein the method further comprises the step of modifying the candidate list of records based on a predefined criterion.

5. The method of claim 4, wherein modifying comprises:

retrieving an additional record from said table partition; and adding the retrieved record to the candidate list of records when the retrieved record satisfies the predefined criterion.

6. The method of claim 5, wherein adding further comprises the steps of:

comparing the retrieved record to one of the records in the candidate list of records; and based on the comparison, determining whether to add the retrieved record to the candidate list of records.

7. The method of claim 6, wherein the method further comprises the step of based on the comparison, determining whether to delete the one record from the candidate list of records.

8. In a database system including one or more processing units, a data store shared by all of said processing units, and a local memory included within each processing unit; an apparatus for selecting one or more of the highest ranking records in a table of records, said apparatus comprising:

one or more computer programs for:

partitioning said table of records into a plurality of table partitions;

associating each one of said table partitions with a different one of said processing units;

at each processing unit, generating a candidate list of records from the table partition associated with the processing unit in said local memory of the processing unit, wherein each record contains a field value, ranking the generated candidate list of records based on the field value, as each new candidate is added to the generated candidate list, when memory space within the local memory of the processing unit is insufficient, transferring the ranked candidate list of records from the local memory of the processing unit to said shared data store, and at the conclusion of processing the records contained in the table partition associated with the processing unit, transferring the ranked candidate list of records from the local memory of the processing unit to said shared data store; and at the data store, identifying a predefined number of extrema values by using the transferred candidate list of records obtained from all of said processing units.

9. The apparatus of claim 8, wherein the data store is a different processor unit that the candidate list of records is hashed to.

10. The apparatus of claim 8, wherein ranking further comprises one or more computer programs, performed by the computer, for partitioning the candidate list of records into two or more groups based on a grouping expression.

11. The apparatus of claim 8, wherein the apparatus further comprises one or more computer programs for modifying the candidate list of records based on a predefined criterion.

12. The apparatus of claim 11, wherein modifying comprises one or more computer programs, performed by the computer, for retrieving an additional record from said table partition, and adding the retrieved record to the candidate list of records when the retrieved record satisfies the predefined criterion.

13. The apparatus of claim 8, wherein adding further comprises one or more computer programs, performed by the computer, for comparing the retrieved record to one of the records in the candidate list of records, and based on the comparison, determining whether to add the retrieved record to the candidate list of records.

14. The apparatus of claim 13, wherein the apparatus further comprises one or more computer programs, performed by the computer, for, based on the comparison, determining whether to delete the one record from the candidate list of records.

15. An article of manufacture comprising a computer program carrier readable by a computer and embodying one or more instructions executable by the computer to perform method steps for selecting one or more of the highest ranking records in a table of records contained in a database system having one or more processing units, a data store shared by all of said processing units, and a local memory included within each processing unit, said method steps comprising:

partitioning said table of records into a plurality of table partitions;

associating each one of said table partitions with a different one of said processing units;

at each processing unit:

generating a candidate list of records from the table partition associated with the processing unit in said local memory of the processing unit, wherein each record contains a field value;

ranking the generated candidate list of records based on the field value, as each new candidate is added to the generated candidate list;

when memory space within said local memory of the processing unit is insufficient, transferring the ranked candidate list of records from the local memory of the processing unit to said shared data store; and at the conclusion of processing the records contained in the table partition associated with the processing unit, transferring the ranked candidate list of records from the local memory of the processing unit to said shared data store; and at the data store, identifying a predefined number of extrema values by using the transferred candidate list of records obtained from all of said processing units.

16. The article of manufacture of claim 15, wherein the data store is a different processor unit that the candidate list of records is hashed to.

17. The article of manufacture of claim 15, wherein ranking further comprises the step of partitioning the candidate list of records into two or more groups based on a grouping expression.

18. The article of manufacture of claim 15, wherein the method further comprises the step of modifying the candidate list of records based on a predefined criterion.

19. The article of manufacture of claim 18, wherein modifying comprises the steps of:

retrieving an additional record from said table partition; and adding the retrieved record to the candidate list of records when the retrieved record satisfies the predefined criterion.

20. The article of manufacture of claim 19, wherein adding further comprises the steps of:

comparing the retrieved record to one of the records in the candidate list of records; and based on the comparison, determining whether to add the retrieved record to the candidate list of records.

21. The article of manufacture of claim 20, wherein the method further comprises the step of based on the comparison, determining whether to delete the one record from the candidate list of records.

* * * * *